United States Patent [19]
Poignant et al.

[11] 3,861,902
[45] Jan. 21, 1975

[54] NEW HERBICIDAL COMPOSITIONS FOR POST-EMERGENCE WEED CONTROL AMONG CEREAL CROPS

[75] Inventors: Pierre Poignant, Lyon; Jacques Rognon, Ecully, both of France

[73] Assignee: Pepro Societe Pour le Developpment et la Vente de Specialites Chemiques, Lyon, France

[22] Filed: Apr. 17, 1973

[21] Appl. No.: 352,083

[30] Foreign Application Priority Data
Apr. 21, 1972   France .............................. 72.14952

[52] U.S. Cl. ......................... 71/108, 71/116, 71/120
[51] Int. Cl. .............................................. A01n 9/24
[58] Field of Search .............. 71/116, 120, 108, 109

[56] References Cited
UNITED STATES PATENTS

| | | | |
|---|---|---|---|
| 2,655,444 | 10/1953 | Todd | 71/120 |
| 2,728,654 | 12/1955 | GenJovich | 71/120 |
| 3,565,601 | 2/1971 | Poignant | 71/116 |
| 3,779,738 | 12/1973 | Pillon et al. | 71/120 |

FOREIGN PATENTS OR APPLICATIONS

| | | | |
|---|---|---|---|
| 4,431,354 | 12/1966 | Japan | 71/116 |

*Primary Examiner*—James O. Thomas, Jr.
*Attorney, Agent, or Firm*—Browdy and Neimark

[57] ABSTRACT

A selective herbicide for killing weeds in cereal grain crops after emergence of the grain and either before or after emergence of the weeds includes a mixture of IPU and MCPP containing at least 0.5 parts of MCPP per part of IPU and applied at the rate of 2–10 kg/ha.

6 Claims, No Drawings

NEW HERBICIDAL COMPOSITIONS FOR POST-EMERGENCE WEED CONTROL AMONG CEREAL CROPS

This invention relates to new herbicidal compositions, especially for post-emergence weed control among cereal crops such as wheat, rye (*Secale cereale*), winter barely (*Hordeum hexastichum*), etc.

More particularly, the invention relates to herbicidal compositions containing as active material a mixture of N-(4-isopropylphenyl)-N',N'-dimethyl urea and 2-(2-methyl-4-chlorophenoxy)-propionic acid or a derivative thereof.

Hereinafter, 4-isopropylphenyl-N',N'-dimethyl urea will be referred to in short as IPU and 2-(2-methyl-4-chlorophenoxy)-propionic acid as MCPP.

Among the various compounds which we have tested, we have surprisingly found that mixtures containing IPU and MCPP or a derivative thereof showed properties totally unexpected from what was known of the properties of each of these compounds when used on their own.

It has in fact been found that the addition of certain quantities of MCPP to IPU eliminates or reduces very considerably the toxicity phenomena obtained with the latter compound.

This is all the more surprising since, when one herbicidal compound is added to another, the phytotoxicity phenomena attributable to one of these compounds when used separately generally tends to be aggravated by the presence of the other.

In the particular case of mixtures of IPU and MCPP, however, the phenomenon observed is precisely the opposite, as shown in the following examples.

Examples 1 to 7 illustrate various compositions in which the percentages are by weight, and MCPP is either in the form of the unsubstituted acid or a derivative thereof.

| Example 1 | Wettable powder |
|---|---|
| IPU | 28% |
| MCPP acid | 21% |
| Calcium lignosulphate (deflocculant) | 8% |
| sodium isopropylnaphthalene sulphonate (wetting agent) | 1% |
| Anti-agglomerant silica | 5% |
| Filler (kaolin) | 37% |

| Example 2 | Wettable powder |
|---|---|
| IPU | 28% |
| MCPP, sodium salt | 24% |
| Calcium lignosulphate | 8% |
| Sodium isopropylnaphthalene sulphonate | 2% |
| Anti-agglomerant silica | 28% |
| Filler (kaolin) | 10% |

| Example 3 | Wettable powder |
|---|---|
| IPU | 40% |
| MCPP, diethanolamine salt | 45% |
| Calcium lignosulphate | 5% |
| Sodium isopropylnaphthalene sulphonate | 2% |
| Anti-agglomerant silica | 8% |

| Example 4 | Wettable powder |
|---|---|
| IPU | 28% |
| MCPP monoethanolamine salt | 27% |
| Calcium lignosulphate | 5% |
| Sodium isopropylnaphthalene sulphonate | 1% |
| Anti-agglomerant silica | 32% |
| Filler (kaolin) | 3% |
| Water | 4% |

| Example 5 | Wettable powder |
|---|---|
| IPU | 28% |
| MCPP amide | 21% |
| Calcium lignosulphate | 8% |
| Sodium isopropylnaphthalene sulphonate | 1% |
| Anti-agglomerant silica | 8% |

| Example 6 | Wettable powder |
|---|---|
| IPU | 28% |
| MCPP, butyl glycol ester | 30% |
| Sodium isopropylnaphthalene sulphonate | 2% |
| Sodium dinaphthylmethane sulphonate | 5% |
| Anti-agglomerant silica | 32% |
| Filler (kaolin) | 3% |

| Example 7 | Aqueous emulsion |
|---|---|
| IPU | 28% |
| MCPP, monoethanolamine salt | 29% |
| Calcium lignosulphate | 3% |
| Water | 40% |

EXAMPLE 8

This Example corresponds to post-emergence tests carried out on 30 square-metre plots with two repetitions using the composition of Example 3. In each test, one plot is left untreated as a control.

The wheat on which the tests were carried out was of the *Magali* variety, and the soil essentially contained a mixture of clay and chalk. The treatment was carried out on wheat plants in the process of tillering, and the results of the treatment were assessed 45 days later.

Table 1 shows the results obtained on wheat with IPU alone on the one hand and, on the other hand, the results obtained with the same quantity of IPU in admixture with a given quantity of MCPP.

The figures appearing in the right-hand column indicate the phytotoxicity of the composition used, expressed as percentage phytotoxicity on the cereal crop in relation to the control.

Table 1

| Product used (kg/ha) | | % cereal phytotoxicity |
|---|---|---|
| I.P.U. | M.C.P.P. | |
| 2.25 | — | 5 |
| 2.25 | 1.9 | 0 |
| 2.5 | — | 10 |
| 2.5 | 2.15 | 5 |
| 4 | — | 50 |
| 4 | 3.4 | 15 |
| 5 | — | 70 |
| 5 | 4.3 | 20 |

EXAMPLE 9

This Example corresponds to post-emergence tests carried out on 30 square-metre plots with two repetitions using the composition of Example 3. In each test, one plot is left untreated as a control.

The wheat on which the tests were carried out was of the *Champlain* variety, and the soil was alluvial. The treatment was carried out on plants in the process of tillering, and the results of the treatment were assessed after 45 days.

Table (II) shows on the one hand the results obtained on wheat with IPU alone and, on the other hand, the results obtained with the same quantity of IPU in admixture with a given quantity of MCPP.

The figures appearing in the right-hand column indicate the phytotoxicity of the composition used expressed as percentage phytotoxocity on the cereal in relation to the control.

Table (II)

| Product used (kg/ha) | | % cereal phytotoxicity |
|---|---|---|
| I.P.U. | M.C.P.P. | |
| 1.5 | — | 10 |
| 1.5 | 1.3 | 0 |
| 1.75 | — | 15 |
| 1.75 | 1.6 | 3 |
| 2.5 | — | 30 |
| 2.5 | 2.15 | 10 |
| 3.5 | — | 60 |
| 3.5 | 3.1 | 20 |

It can be seen from the results of these tests that, irrespective of the doses used and the type of soil, complete elimination of, or at least a substantial reduction in, phytotoxicity is repeatedly obtained by the addition of a certain quantity of MCPP to the IPU.

So far as the herbicidal results of these compounds are concerned, their effect on weeds was consistently outstanding, and in many cases there was a synergistic effect.

The herbicidal activity is particularly well illustrated in the case of IPU and mixtures of IPU with MCPP where detailed assessments were made upon the destruction of the wild spring oat (*Avena fatua*) which is one of the largest weeds, and at the same time, the most important to be destroyed among cereal crops.

The results are set out in Table (III):

Table (III)

| Product used (kg/ha) | | % destruction of wild spring oat |
|---|---|---|
| I.P.U. | M.C.P.P. | |
| 2 | — | 15 |
| 2 | 1.7 | 95 |
| 2.25 | — | 85 |
| 2.25 | 1.9 | 100 |
| 2.5 | — | 85 |
| 2.5 | 2.12 | 100 |

Excellent results were also obtained in the destruction of black grass (*Alopecurus myosuroides*), rye grass (*Lolium rigidum*) and in the destruction of the various dicotyledons present.

The doses in which the compositions are used can vary within wide limits depending upon the activity of the composition used, upon the type of weed control to be obtained, upon the development stage of the plant and of the weeds and upon the type of soil and atmospheric conditions.

In general, doses in the range of from 2 to 10 kg/ha of the active material are sufficient.

The compositions according to the invention can be applied either after emergence of the plant but before emergence of the weeds, or after emergence both of the plant and of the weeds.

The compositions according to the invention can also be used either on their own or in admixture with other herbicidal compounds, which may belong either to the same chemical family or to other families and are capable of extending or completing the range of activity.

The compositions can also be used with so-called synergists capable of strengthening their effect in small quantities.

Finally, they may optionally be used in combination with fungicides, insecticides and nematocides, more particularly in conjunction with pesticides of the kind that are active against soil parasites in order to obtain a mixed treatment in a single run over the area to be treated.

The relative percentages of the two constituents of the mixture can vary within wide limits. Effective results have been obtained with mixtures containing 0.5-2 parts of MCPP per part of IPU, the range of 0.5-1 being preferred.

Throughout the foregoing, reference has been made to MCPP and its derivatives. In the context of the invention, MCPP derivatives are understood to be the various forms in which MCPP is normally used for practical application, e.g., in the form of acid amides, esters, metal salts, especially alkali and alkaline-earth metal salts such as sodium and magnesium salts, amine salts or alkanolamine salts.

For their practical application, the compounds according to the invention are rarely used on their own. More often they are part of formulations generally comprising a carrier and/or surfactant in addition to the active material according to the invention.

In the context of the invention, a carrier may be an organic or inorganic, natural or synthetic material with which the active material is associated to facilitate its application to the plant, to seeds or to the soil, or its transportation or handling. The carrier can be solid (e.g., clays, natural or synthetic silicates, resins, waxes or solid fertilizers) or liquid e.g., water, alcohols, ketones, petroleum fractions, chlorinated hydrocarbons or liquefied gases).

The surfactant can be an emulsifier, dispersant or wetting agent of the ionic or non-ionic type, such as, for example, salts of polyacrylic acids, lignin sulphonic acids, condensates of ethylene oxide with fatty alcohols, fatty acids or fatty amines.

The compositions according to the invention can be prepared in the form of wettable powders, dusting powders, granulates, solutions, emulsifiable concentrates, emulsions, suspended concentrates or aerosols.

The wettable powders according to the invention can be prepared in such a way that they contain from 20 to 95 percent by weight of active material. They normally contain, in addition to a solid carrier, from 0 to 5 percent of a wetting agent, from 3 to 10 percent by weight of a dispersant and, when necessary, from 0 to 10 percent by weight of at least one stabilizer and/or other adhesives as penetration agents, adhesives, antiagglomerants, or colorants.

The suspended concentrates which can also be applied by spraying are prepared in such a way that a liquid, stable non-sedimenting product is obtained. They normally contain from 10 to 75 percent by weight of the active material, from 0.5 to 15 percent by weight of surfactants, from 0.1 to 10 percent by weight of antisedimenting agents such as protective colloids and thixotropic agents, from 0 to 10 percent by weight of suitable additives as antifoam agents, corrosion inhibitors, stabilizers, penetration agents or adhesives and, as carrier, water or an organic liquid in which the active material is substantially insoluble. Certain solid organic materials or mineral salts can be dissolved in the carrier to assist in preventing sedimentation or as antigels for the water.

Aqueous dispersions and emulsions, for example compositions obtained by dilution with a wettable powder or an emulsifiable concentrate according to the invention, are included in the general scope of the invention. These emulsions can be of the water-in-oil type or of the oil-in-water type and can have a thick consistency resembling that of a "mayonnaise."

The compositions according to the invention can conatin other ingredients, for example protective colloids, adhesives or thickeners, thixotropic agents, stabilizers or sequestrants.

What is claimed is:

1. A herbicidal composition comprising (i) N-(4-isopropylphenyl)-N',N'-dimethylurea and (ii) 2-(2-methyl-4-chlorophenoxy)-propionic acid or a derivative thereof, in an amount sufficient to kill wild spring oats without substantial killing of cereal crops, said urea or derivative thereof being present in said composition in proportion by weight of 0.5–2.0 to said acid or derivative thereof, together with (iii) an inert carrier or diluent.

2. A composition according to claim 1 further, comprising a surfactant.

3. A composition according to claim 2, in which the derivative of 2-(2-methyl-4-chloro-phenoxy)-propionic acid is the amide, ester, metal salt or amine salt of said propionic acid.

4. A process for weed control in cereal crops after the emergence of the cereal crop in which a composition as claimed in claim 1 is used in an amount effective to kill the weeds without substantial killing of the cereal crop.

5. A process in accordance with claim 4 wherein said composition is used at the rate of 2–10 kg. of active compounds per hectare.

6. A composition in accordance with claim 3 wherein said 2-(2-methyl-4-chloro-phenoxy)-propionic acid derivative is selected from the group consisting of the sodium and magnesium salt, the diethanolamine salt, the monoethanol amine salt, the amide, and the butyl glycol ester of said propionic acid.

* * * * *

UNITED STATES PATENT OFFICE
CERTIFICATE OF CORRECTION

PATENT NO. : 3,861,902
DATED : January 21, 1975
INVENTOR(S) : Pierre POIGNANT et al.

It is certified that error appears in the above-identified patent and that said Letters Patent are hereby corrected as shown below:

Column 1, line 8, delete "winter barely" and insert --winter barley--.

Column 2, line 3, delete "Example 1" and insert --Example 4--.

Signed and sealed this 27th day of May 1975.

(SEAL)
Attest:

RUTH C. MASON
Attesting Officer

C. MARSHALL DANN
Commissioner of Patents
and Trademarks